Aug. 23, 1927.
J. E. JUFE
1,640,336
SAFETY APPARATUS FOR VEHICLES
Filed Feb. 11, 1926    2 Sheets-Sheet 1
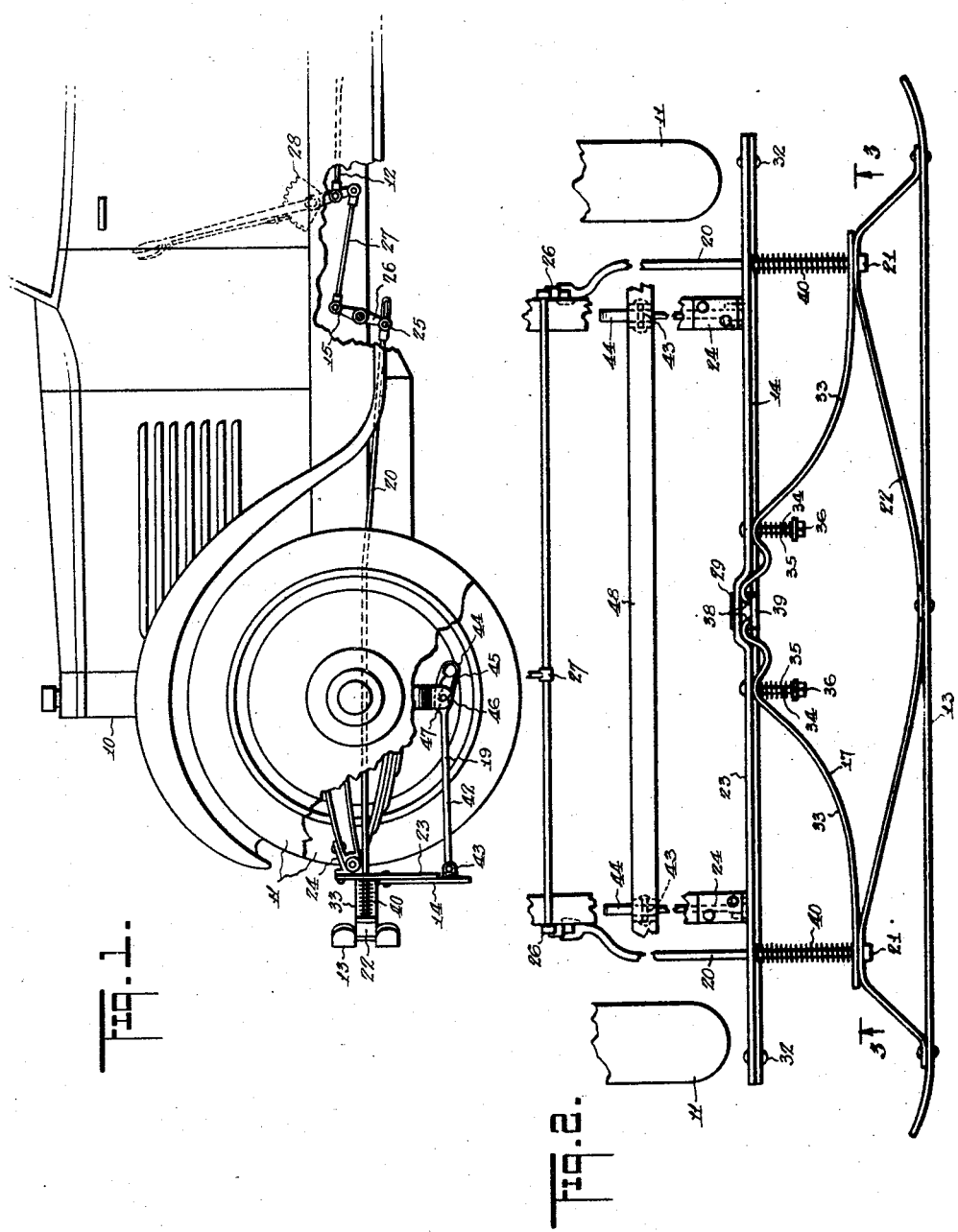
WITNESSES
INVENTOR
Joseph Edward Jufe.
BY
ATTORNEYS

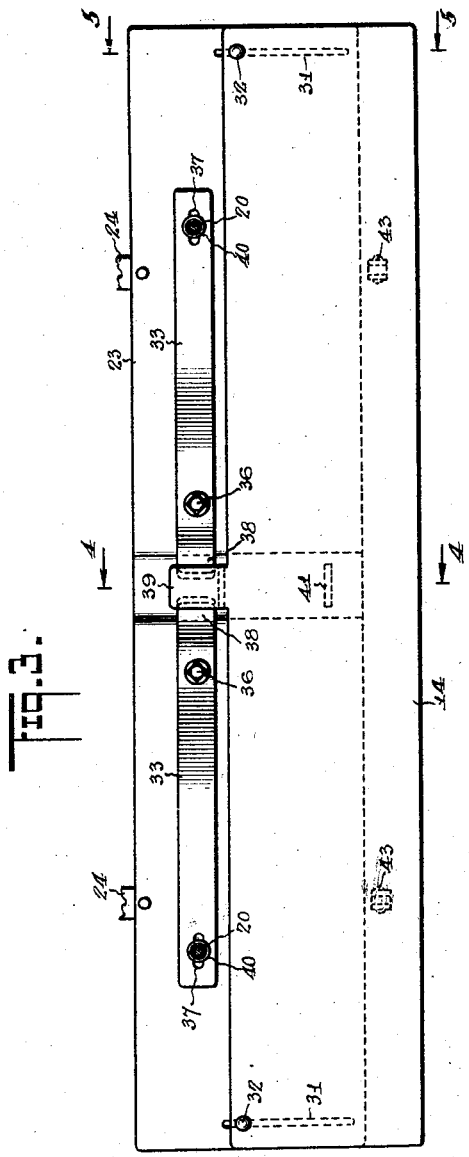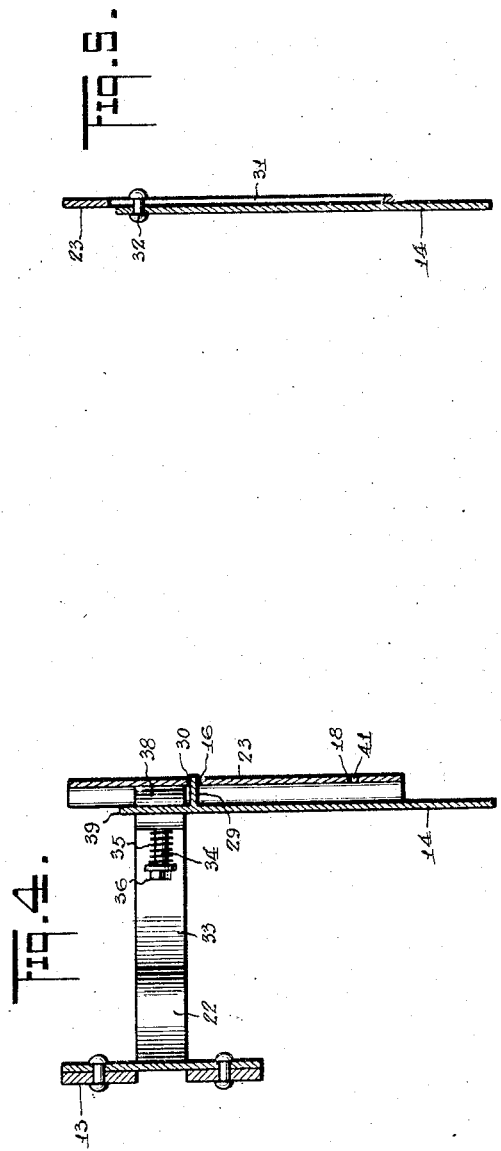

Patented Aug. 23, 1927.

1,640,336

UNITED STATES PATENT OFFICE.

JOSEPH EDWARD JUFE, OF NEW YORK, N. Y., ASSIGNOR TO FANNIE JUFE, OF NEW YORK, N. Y.

SAFETY APPARATUS FOR VEHICLES.

Application filed February 11, 1926. Serial No. 87,558.

This invention relates to a safety apparatus for vehicles, and has especial reference to an apparatus operable in response to a force applied to a part thereof to stop the progress of the vehicle to prevent serious damage to the vehicle, and when the force is applied to said part due to contact with a person in the way of the vehicle to safeguard such person against being run over by the vehicle.

The principal object of the present invention is the provision on a vehicle of an apparatus of the indicated character which will be comparatively simple in construction, more thoroughly efficient and effectual in carrying out the results sought.

The nature of the invention and its distinguishing features and advantages will appear when the following specification is read in connection with the accompanying drawings, in which—

Figure 1 is a side elevation of the front end of an automobile with the apparatus of the present invention applied thereto, a portion of one of the front road wheels of the automobile being broken away to more clearly show parts of the apparatus.

Fig. 2 is a plan view showing the assemblage and structural features of parts of the apparatus.

Fig. 3 is a sectional view taken on the line 3—3 of Fig. 2 and illustrating the wheel guard and its connections.

Fig. 4 is a sectional view taken on the line 4—4 of Fig. 3.

Fig. 5 is a sectional view taken on the line 5—5 of Fig. 3.

Generally stated, the apparatus of the present invention comprises the combination of a vehicle 10 including front road wheels 11 and brake mechanism, a portion of which is illustrated at 12, for applying a braking action to the rear road wheels of the vehicle; a bumper 13, a front road wheel guard 14, means 15 connected between the bumper 13 and the mechanism 12 for applying the brakes in response to a force applied to said bumper, means 16 for holding the guard normally elevated in a manner to permit the guard to drop to a guarding position in response to the operation of a means 17 connected to the bumper 13, means 18 limiting the downward movement of the guard 14, and means 19 for bracing the guard when the latter is in a lowered guarding position.

More specifically stated the means hereinbefore mentioned is constructed, arranged and operates in a manner presently to be described. The bumper 13 may be of any preferred construction and is arranged transversely in advance of the front road wheels 11 of the vehicle 10. The bumper 13 has connected thereto rods 20 at opposite ends thereof respectively at the rear as at 21 to an irregular bar 22. The rods 20 extend through a support 23 in the form of a plate arranged transversely in advance of the road wheels 11. The support is fixed in place by the use of brackets 24 attached to the support 23 and to the front ends respectively of the frame of the chassis of the vehicle. Each rod 20 is connected as at 25 to one end of a lever 26 whose opposite end is connected by a short rod 27 to the extremity beyond the pivotal connection of an emergency brake lever 28. The rods 20, bar 22, lever 26, and short rod 27 constitute the means 15 hereinbefore mentioned connected to the brake mechanism for applying the brakes. The lever 28 is included in the brake mechanism 12 hereinbefore mentioned which can be of any preferred type. The guard 14 is in the form of a plate substantially equal in length to the support 23 and is arranged in front of the same. The means 16 for holding the guard normally elevated comprises a lug 29 at the rear of a flexible portion of the guard 14, and the said lug is movable into and out of an opening 30 in the support 23. The support 23 at the opposite ends thereof is provided with slots 31 which accommodate headed pins 32 respectively for guiding the guard 14 in its movement up and down. The means 17 hereinbefore mentioned for releasing the guard 14 so that it may drop to a guarding position comprises levers 33 each of which is fulcrumed by the employment of a bolt 34 carried by the support 23. A spring 35 surrounds each bolt between a portion of the lever and the washer and nut 36 on the bolt. One end of each lever 33 has a slot 37 therein through which the associated rod 20 extends, and the opposite end 38 of each lever 33 bears against an extension 39 on the guard 14. A spring 40 surrounds a portion of each of the rods 20 and one end of the spring bears against the slotted end of the associated lever 33, and the opposite end of the spring bears against the support 23. The springs 40 are expansible springs and have a normal tendency to maintain the slotted ends respectively of the lever 33 in engagement with adjacent portions of the bar 22. It is also to be noted at this time that the springs 40 also serve to yieldingly maintain the bumper 13 in an extended position and capable of moving rearwardly when a force is applied to the bumper. It will now be apparent that when a force is applied to the bumper 13 the same will move rearwardly, and as a consequence the brake mechanism 12 will be operated to apply the brakes. At the same time the levers 33 will be moved respectively on their fulcrums causing the ends 38 to press on the extension 39 and as a consequence the lug 29 will be withdrawn from the opening 30. The guard 14 is sufficiently flexible to permit this action. The guard then drops until the lug 29 engages in an opening 41 in the support 23 to thus limit the downward movement of the guard 14 and to hold the same elevated slightly so as not to come in contact with the road surface. The means 19 for backing up the lower end of the guard 14 to provide the necessary rigidity when the guard is in the lowered guarding position includes rods 42 respectively at opposite ends of the guard 14. Each of the rods 42 is pivotally connected as at 43 to the guard 14 and the opposite end of the rod is provided with a loop 44 having on the inside of a portion thereof teeth 45 which are engageable respectively with a member 46 extending through the loop 44 and supported by spaced lugs 47 attached to the front axle 48 of the vehicle. It follows therefore, that when the guard 14 is permitted to drop to a guarding position one of the teeth of each of the loops will be engaged with its related member 46 to effectively brace the guard 14.

It is to be understood that when the brake mechanism 12 is operated to apply the brakes due to the force applied to the bumper 13 that the emergency brake lever 28 will be held in the usual manner to maintain the application of the brakes, and this will prevent the springs 40 from returning the parts connected to the bumper to normal position.

It is thought that the manner in which the apparatus of the present invention operates will be fully understood from the foregoing description and a more extended explanation will therefore be omitted.

It is to be understood that the invention is not restricted to the precise arrangement of parts shown and described, as details of construction may be modified and rearranged without departing from the spirit of the invention, the scope of which is limited only by the terms of the appended claims.

I claim:

1. In a vehicle safety apparatus, a fixed support in the form of a rigid plate, a front road wheel guard substantially similar to the fixed support, means associating the guard with the fixed support for sliding movement in overlapping relationship, a bumper, means supporting the bumper for movement, said bumper disposed in advance of said support and guard, means releasably holding the guard normally elevated consisting of a flexible portion embodied by said guard, and a lug on said flexible portion engageable in and disengageable from an opening in the fixed support; levers arranged respectively between portions on the bumper and an extension on said flexible portion, means acting on the levers and bumper holding the levers ready for operation and the bumper in a position from which it may move rearwardly to cause the levers to flex said flexible portion to disengage said lug to release said guard to drop to a guarding position.

2. In a vehicle safety apparatus, a fixed support in the form of a rigid plate, a front road wheel guard substantially similar to the fixed support, means associating the guard with the fixed support for sliding movement in overlapping relationship, a bumper, means supporting the bumper for movement, said bumper disposed in advance of said support and guard, means releasably holding the guard normally elevated consisting of a flexible portion embodied by said guard, and a lug on said flexible portion engageable in and disengageable from an opening in the fixed support; levers arranged respectively between portions on the bumper and an extension on said flexible portion, means acting on the levers and bumper holding the levers ready for operation and the bumper in a position from which it may move rearwardly to cause the levers to flex said flexible portion to disengage said lug to release said guard to drop to a guarding position, and means limiting the downward movement of the guard.

3. In a vehicle safety apparatus, a fixed support in the form of a rigid plate, a front road wheel guard substantially similar to the fixed support, means associating the guard with the fixed support for sliding movement in overlapping relationship, a bumper, means supporting the bumper for movement, said bumper disposed in advance of said support and guard, means releasably holding the guard normally elevated consisting of a flexible portion embodied by said guard, and a lug on said flexible portion engageable in and disengageable from an opening in the fixed support; levers arranged respectively between portions on the bumper and an extension on said flexible portion, means acting on the levers and bumper holding the levers ready for operation and the bumper in a position from which it may move rearwardly to cause the levers to flex said flexible portion to disengage said lug to release said guard to drop to a guarding position, means limiting the downward movement of the guard, and means functioning to brace the lower portion of the guard.

JOSEPH EDWARD JUFE.